United States Patent
Marumoto

(10) Patent No.: US 6,295,590 B1
(45) Date of Patent: Sep. 25, 2001

(54) SEMICONDUCTOR MEMORY APPARATUS HAVING A PROTECTING CIRCUIT

(75) Inventor: Kyoji Marumoto, Kyoto (JP)

(73) Assignee: Rohm Col, Ltd., Kyoto (JP)

( * ) Notice: Subject to any disclaimer, the term of this patent is extended or adjusted under 35 U.S.C. 154(b) by 0 days.

(21) Appl. No.: 08/353,254

(22) Filed: Dec. 2, 1994

(30) Foreign Application Priority Data

Dec. 3, 1993 (JP) .................................................. 5-303609

(51) Int. Cl.$^7$ .................................................. G06F 12/14
(52) U.S. Cl. ........................ 711/164; 380/43; 713/202
(58) Field of Search ..................... 380/43, 44; 713/202

(56) References Cited

U.S. PATENT DOCUMENTS

| | | | |
|---|---|---|---|
| 4,513,389 | * | 4/1985 | Devchoudhury ...................... 395/491 |
| 4,654,829 | * | 3/1987 | Jiang et al. ...................... 365/189.03 |
| 4,725,982 | * | 2/1988 | Hara et al. .............................. 326/58 |
| 4,819,204 | * | 4/1989 | Schrenk ................................ 395/491 |
| 4,907,186 | * | 3/1990 | Racey .................................... 395/250 |
| 4,933,577 | * | 6/1990 | Wong et al. ............................. 326/40 |
| 5,073,925 | * | 12/1991 | Nagata et al. ............................ 380/3 |
| 5,377,343 | * | 12/1994 | Yaezawa ................................. 395/491 |
| 5,428,685 | * | 6/1995 | Kadooka et al. ....................... 380/25 |
| 5,432,950 | * | 7/1995 | Sibigtroth ............................. 395/490 |

OTHER PUBLICATIONS

Lim, C. H., et al., "Smart Card Reader," IEEE Transactions on Consumer Electronics, v39, pp8, 10, Feb. 1993.*

* cited by examiner

Primary Examiner—Hiep T. Nguyen
(74) Attorney, Agent, or Firm—Arent Fox Kintner Plotkin & Kahn, PLLC

(57) ABSTRACT

A semiconductor memory incorporates a protecting circuit which causes data, stored in a memory portion, to be output by executing a key canceling sequence from an external apparatus. The data stored in the memory are output only when a key canceling signal is input to the protecting circuit. Thus the data are not output only by inputting an address signal and a reading signal to the memory apparatus. As a result, it is impossible to find out the contents of the program stored in the memory portion without inputting the key canceling signal.

4 Claims, 4 Drawing Sheets

SEMICONDUCTOR MEMORY APPARATUS HAVING A PROTECTING CIRCUIT

BACKGROUND OF THE INVENTION

1. Field of the Invention

The present invention relates to a semiconductor memory apparatus.

2. Description of the Prior Art

Generally, a semiconductor memory apparatus outputs data stored therein when an address signal and a reading signal are inputted thereto. On the other hand, most of the semiconductor memories are general-purpose products which are compatible with one another even though made by different manufacturers.

For these reasons, it is easy to find out what data are stored in a semiconductor memory, so that it may be possible to illegally copy the data stored in the memory to provide it in another apparatus in order that various functions can be used without permission. For example, in the case of the satellite broadcasting for which viewers have to pay, the receivers are programmed so that only contractors can receive the satellite broadcasting. However, the satellite broadcasting can be received without permission by reading out the contents of the memory in which the program is stored, copying them to another memory and providing the memory in a receiver. Such an illegal use can also be made in the case of apparatuses such as game apparatuses.

SUMMARY OF THE INVENTION

An object of the present invention is to provide a semiconductor memory apparatus from which stored data cannot easily be taken out to prevent an illegal use of the data.

According to the present invention, a semiconductor memory apparatus incorporates a protecting circuit which causes data stored in a memory portion to be output by executing a key canceling sequence in response to an input of a signal from an external apparatus. According to such a feature, the data stored in the memory portion are output only when a key canceling signal, input from an external apparatus, is input to the protecting circuit to execute the key canceling sequence, so that the data are not output only by inputting an address signal and a reading signal to the memory apparatus. As a result, it is impossible to find out the contents of the program stored in the memory portion. The key canceling signal input from an external apparatus is supplied, for example, by a microcomputer which controls the memory apparatus.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
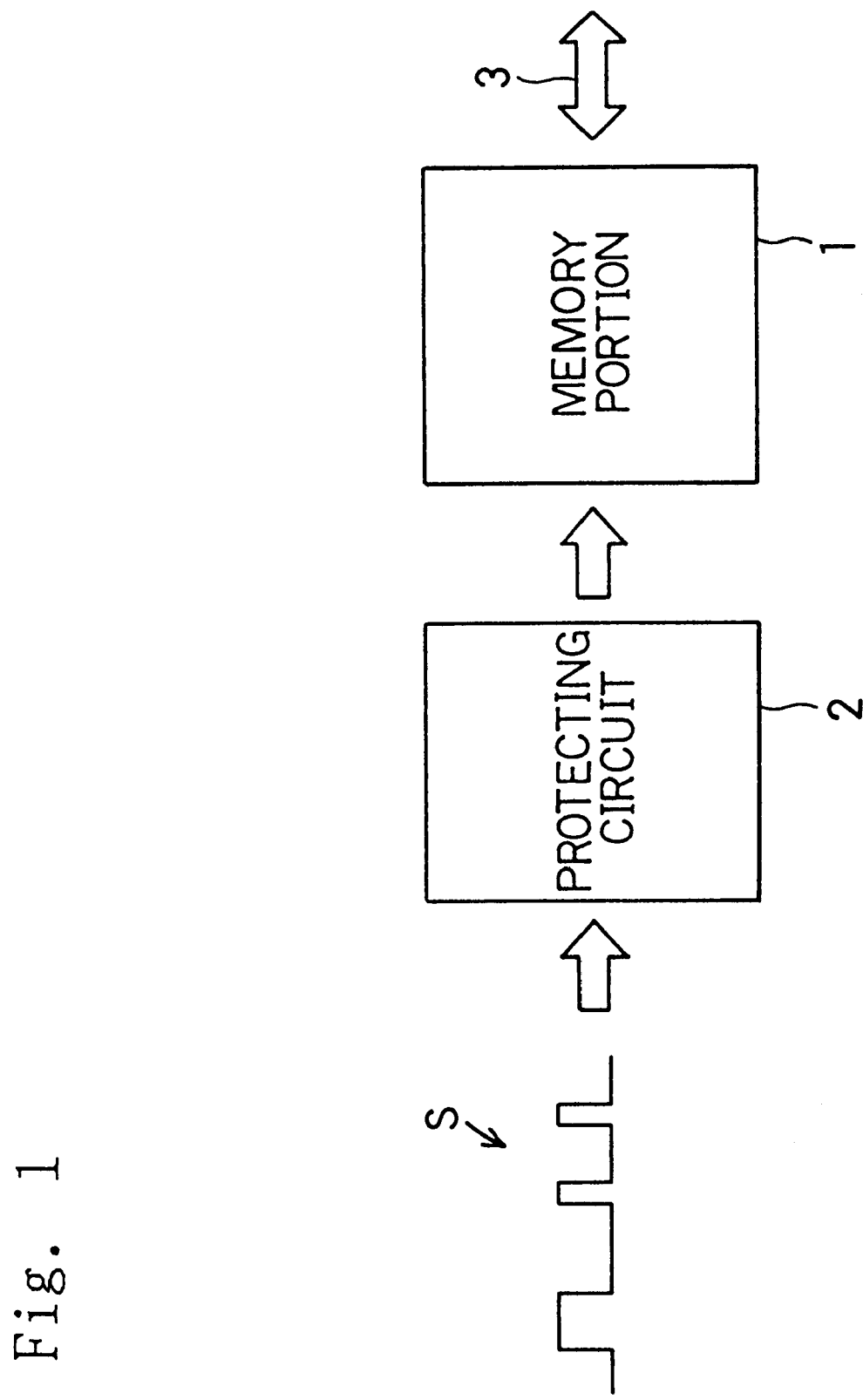
FIG. 1 is a block diagram showing the basic structure of a semiconductor memory apparatus of the present invention.

Referring to FIG. 1, there is shown the basic arrangement of a memory apparatus of the present invention. A memory portion 1 transfers data with a microcomputer through a bus 3. In this figure, the bus 3 represents a data bus, an address bus and a control bus as one bus. The memory portion 1 is a read only memory (ROM) or a random access memory (RAM). The memory portion 1 may be an electrically programmable read only memory (EPROM), an electrically erasable programmable read only memory (EEPROM) or a ferroelectronic random access memory (FRAM).

The data stored in the memory portion 1 can be output only when a canceling signal, which enables data output from the memory portion 1, is output from a protecting circuit 2. The case where the canceling signal is output is a case where a key canceling signal is input from an external apparatus to the protecting circuit 2 and a key canceling sequence is executed in the protecting circuit 2.

Figure 2:
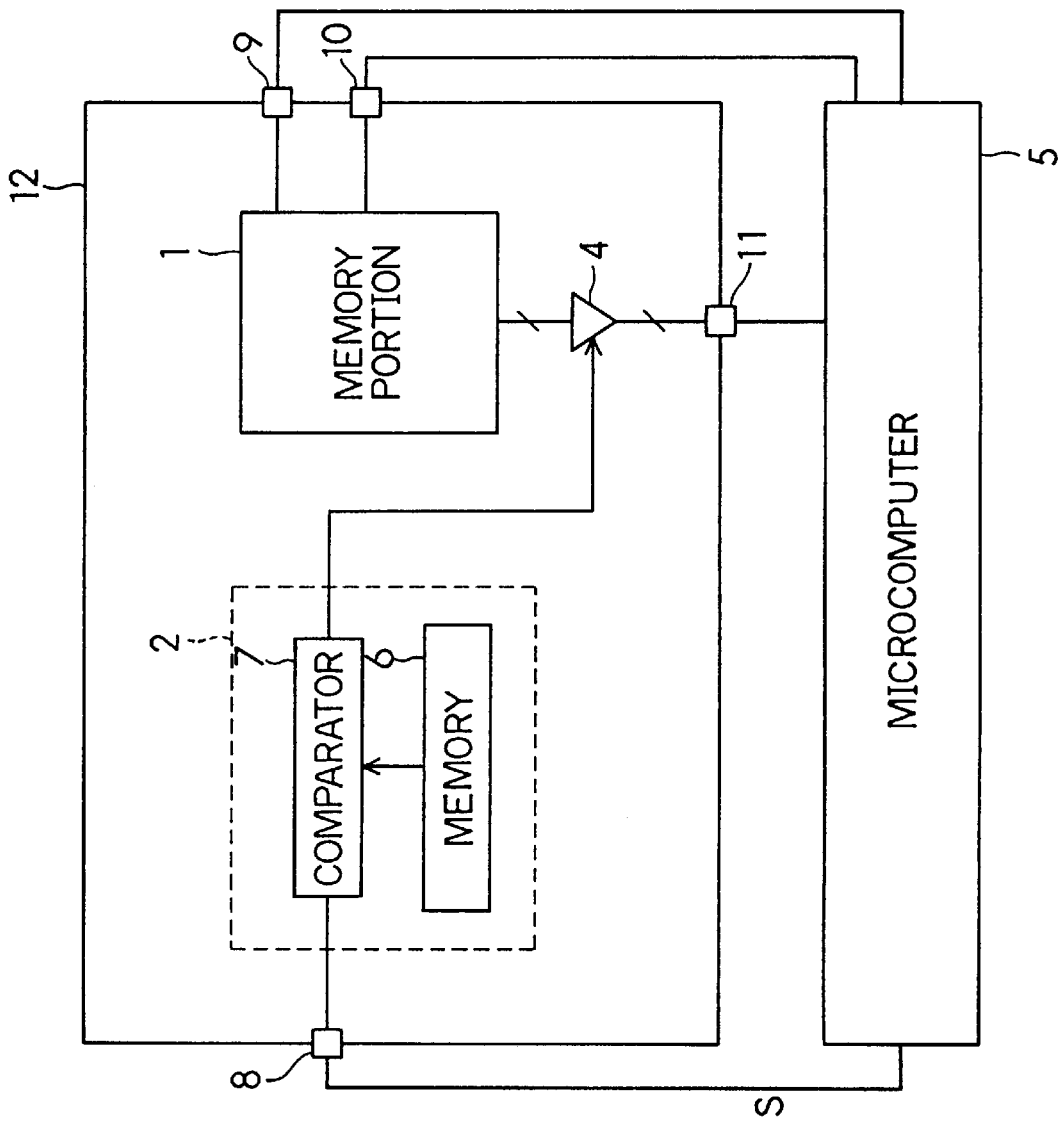
FIG. 2 is a block diagram showing a semiconductor memory apparatus which is an embodiment of the present invention.

Referring to FIG. 2, there is shown a specific embodiment. Reference numeral 12 represents a semiconductor memory apparatus including a one-chip integrated circuit incorporating the memory portion 1 and the protecting circuit 2. A buffer 4 is connected to the output side of the memory portion 1. The buffer 4 is activated when an enabling signal is supplied from the protecting circuit 2 to enable the output of the data stored in the memory portion 1 to an output terminal 11. When no enabling signal is supplied, the memory portion 1 is cut off from the output terminal 11.

Reference numeral 5 represents a microcomputer which supplies the memory portion 1 with a control signal such as a reading command through a terminal 9 and an address signal through a terminal 10. The microcomputer 5 also supplies the protecting circuit 2 with a key canceling signal S through a terminal 8. The key canceling signal S may be supplied when the microcomputer is activated or may be supplied when necessary with the power being activated. The microcomputer 5 and the memory apparatus 12 are mounted on the same printed circuit board (not shown).

The protecting circuit 2 includes a memory 6 for storing key protecting data therein, and a comparator 7. The comparator 7 compares a signal input through the terminal 8 and a data in the memory 6. When they coincide with each other, the comparator outputs an enabling signal, and when they do not coincide, the comparator 7 outputs no enabling signal.

The data in the memory 6 is read out, for example, through an address counter. The address counter is provided in the protecting circuit 2. The terminals 9 and 10 are also connected to the protecting circuit 2 to control the reading out of the memory 6. It is impossible to find out the contents of the memory 6 since the data stored in the memory 6 are not output from the memory apparatus 12.

The data stored in the memory portion 1 is output from the memory apparatus 12 through the output terminal 11. However, when the memory apparatus 12 is detached from the printed circuit board to copy the data stored therein, no enabling signal is generated and the buffer 4 is deactivated, so that it is impossible to provide the data stored in the memory portion 1 to another apparatus. That is, generally, to copy the data stored in a memory, the memory apparatus is detached from the printed circuit board and the data is copied in another memory with a predetermined reading function. However, since no data are output from the memory apparatus by this method, it is impossible to copy the data.

In another embodiment, a three-state output buffer may be used as the buffer 4 so that the key canceling signal S is input to the memory apparatus 12 through the terminal 11. Specifically, when the key canceling signal S is not inputted to the protecting circuit 2, no enabling signal is outputted from the protecting circuit 2, so that the buffer is in a high impedance state. Therefore, under this condition, the key canceling signal S can be inputted from the terminal 11 to the protecting circuit 2 through the buffer 4. With this arrangement, the input terminal 8 is unnecessary.

Figure 3:
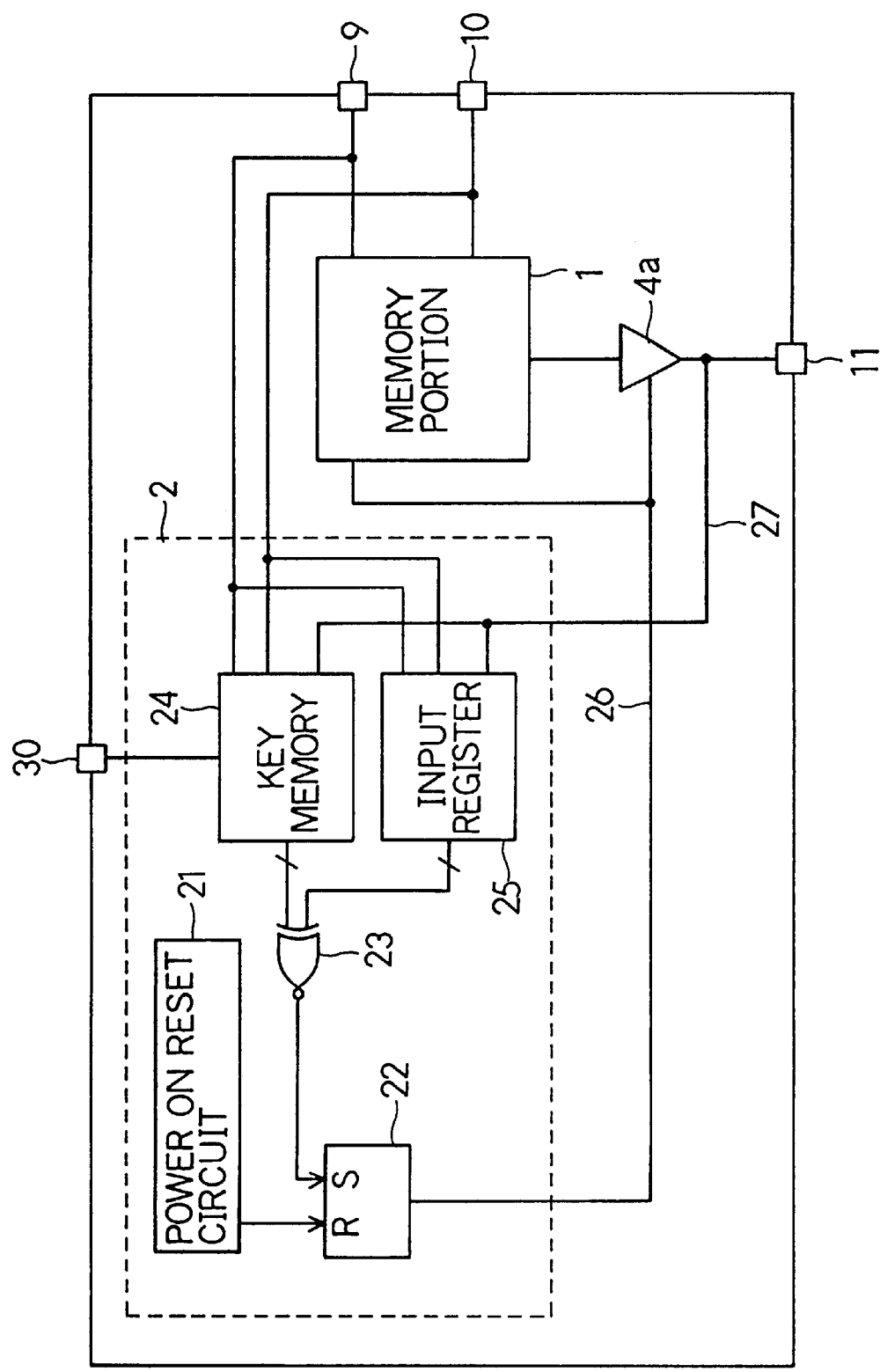
FIG. 3 is a block diagram showing details of another embodiment of the present invention.

Referring to FIG. 3, there is shown an embodiment of such an arrangement. In this figure, the same portions and elements as those of FIG. 2 are identified by the same reference designations. Reference numeral 21 represents a power on reset circuit which resets an input register 25 and an RS flip flop 22 when the power is activated. When the RS flip flop 22 is reset, the level of its output is changed to low. When the input register 25 is reset, the data stored therein are cleared. Reference numeral 24 represents a key memory in which key data are stored. Reference numeral 23 represents a comparator comprising an exclusive "or" circuit which sets the RS flip flop 22 when the output data of the key memory 24 and the output of the input register 25 coincide with each other. The key memory 24 and the input register 25 each output, for example, 8-bit data.

Reference designations 4a represents a three-state buffer which not only can be of high and low levels but also can be in a high impedance state. The three-state buffer 4a is brought into the high impedance state when a low level signal is supplied through a line 26 and brought into the two-value state of high and low levels when a high level (enabling) signal is supplied. Reference numeral 30 represents an enabling terminal which permits the writing of the key data in the key memory 24. The writing in the key memory 24 is enabled when the level is high.

Subsequently, an operation will be described. When the power is activated, the contents of the input register 25 are cleared by the power on reset circuit 21. Also, the RS flip flop 22 is reset, so that the level of the line 26 becomes low. The memory portion 1 is disabled when a low level signal is supplied through the line 26.

The three-state buffer 4a is brought into the high impedance state by being supplied with a low level signal through the line 26, so that the memory portion 1 is cut off from the terminal 11. When a key canceling signal is input through the terminal 11 under this condition, the key canceling signal is supplied by way of a line 27 to the input register 25. At this time, the key canceling signal is written in the input register 25 by an address signal input through the address terminal 10 and a control signal input through the control terminal 9. After the data is written in the input register 25, a data is output from each of the key memory 24 and the input register 25. The data are compared by the comparator 23. When the output of the input register 25 and the output of the key memory 24 coincide with each other, the comparator 23 sets the RS flip flop 22. This changes the level of the output of the RS flip flop 22 to high, so that an enabling signal is supplied by way of the line 26 to the memory portion 1 to bring the memory portion 1 into an operable state and that the three-state buffer 4a is brought from the high impedance state to the two-value state of high and low levels. Under this condition, the program stored in the memory portion 1 can be output to the terminal 11.

Since the RS flip flop 22 continues being reset when the correct key canceling signal is not written in the input register 25, the memory portion 1 continues being disabled and the three-state buffer 4a continues being in the high impedance state, so that the program stored in the memory portion 1 cannot be output to the terminal 11.

The key memory 24 is an EPROM or an EEPROM or a FRAM. The key data are addressed by an address signal input through the terminal 10 when the level of the terminal 30 is high, and the key data input from the terminal 11 through the line 27 can be written by a control signal input through the terminal 9. Once written, the key data are held in the key memory 24 even if the power is deactivated, since the memory portion 1 is a non-volatile memory.

Figure 4:
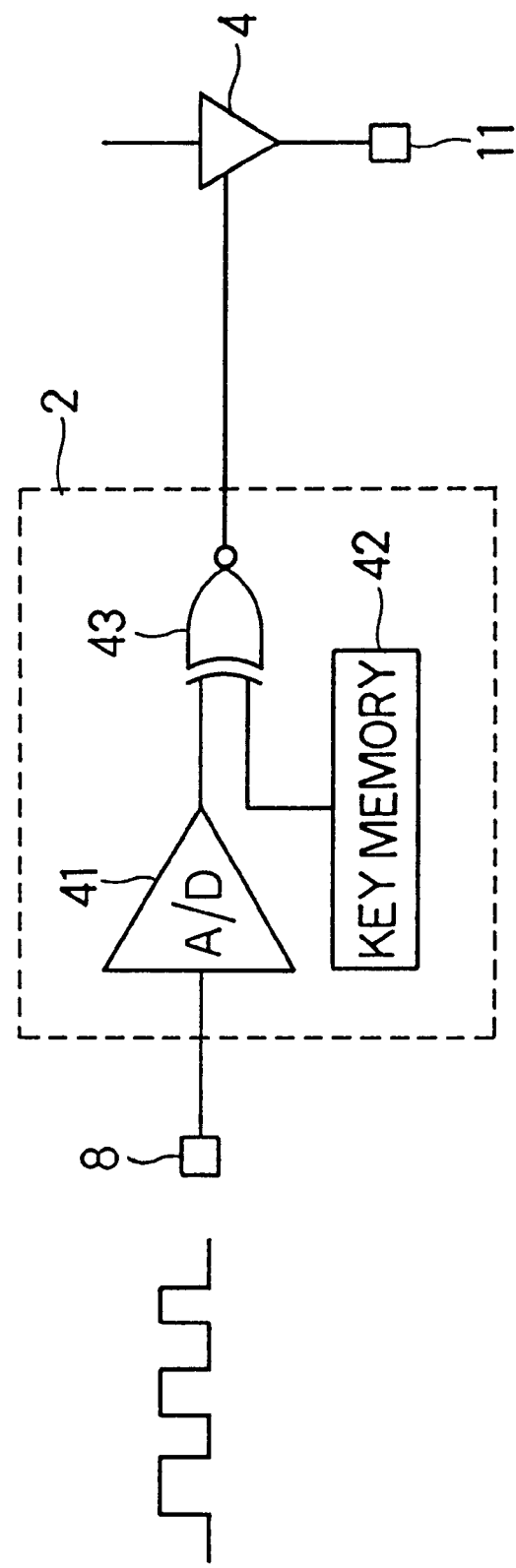
FIG. 4 is a block diagram showing a part of still another embodiment of the present invention.

Referring to FIG. 4, there is shown a key protecting circuit 2 suitable for use in a case where analog values are used as the key canceling sequence. Analog values intermittently input from an external apparatus through the input terminal 8 are converted to digital values by an A/D converter 41. The digital values are compared with the key data stored in a key memory 42 by a comparator 43. The buffer 4 is controlled by the comparison output. The analog values input at this time constitute a sequence such that the first value represents two volts, the second, one volt and the third, five volts. The analog values may constitute a sequence of current values instead of the sequence of voltage values. When the key data of the key memory 42 and the output data of the analog to digital converter 41 coincide with each other, the level of the comparator 43 becomes high. When they do not coincide, the level is low.

Obviously, many modifications and variations of the present invention are possible in light of the above teachings. It is therefore to be understood that within the scope of the appended claims, the invention may be practiced other than as specifically described.

What is claimed is:

1. A semiconductor memory apparatus, comprising:
    a memory portion storing a program;
    a terminal for external connection;
    a three-state buffer, one end of said three-state buffer is connected to said memory portion so that said three-state buffer can receive program data from said memory portion, and another end of said three-state buffer is connected to said terminal for external connection, said three-state buffer being capable of taking a high-impedance state in addition to two-value states of high-level and low-level;
    a key memory for storing key data;
    an input register, connected to said terminal for external connection, for storing a key release signal received via said terminal when said three-state buffer is in the high-impedance state;
    an RS flip-flop connected to said three-state buffer, for turning said three-state buffer into the high-impedance state to disconnect said memory portion from said terminal under a reset state and for canceling the high-impedance state under a set state;
    a power-on reset circuit for resetting said RS flip-flop when a power is turned on; and
    a comparator for comparing an output from said key memory and an output from said input register to set said RS flip-flop when the two outputs coincide.

2. A semiconductor memory apparatus as claimed in claim 1, wherein said key memory is connected to said terminal so that key data can be written into said key memory via said terminal when said three-state buffer is in the high-impedance state.

3. A semiconductor memory apparatus as claimed in claim 2, further including an enable terminal for receiving an enable signal that enables key data to be written into said key memory.

4. A semiconductor memory apparatus as claimed in claim 3, wherein said key memory is formed with a non-volatile memory.

* * * * *